United States Patent [19]

Langecker

[11] Patent Number: 4,883,630
[45] Date of Patent: Nov. 28, 1989

[54] METHOD FOR PRODUCING HOLLOW ARTICLES OF THERMOPLASTIC MATERIALS

[75] Inventor: Günter Langecker, Meinerzhagen, Fed. Rep. of Germany

[73] Assignee: Battenfeld Fischer Blasformtechnik GmbH, Lohmar, Fed. Rep. of Germany

[21] Appl. No.: 944,856

[22] Filed: Dec. 22, 1986

[30] Foreign Application Priority Data

Dec. 20, 1985 [DE] Fed. Rep. of Germany ....... 3545162

[51] Int. Cl.$^4$ ..................... B29C 49/06; B29C 49/12; B29C 49/22; B29C 49/64
[52] U.S. Cl. ................................. 264/513; 264/522; 264/550; 425/387.1; 425/130
[58] Field of Search .................. 264/513, 515, 328.7, 264/510, 550, 521, 522, 531, 532, 533; 425/387.1, 525, 528, 529, 533, 130; 537/320, 327, 328.8, 328.12, 328.14

[56] References Cited

U.S. PATENT DOCUMENTS

| | | | |
|---|---|---|---|
| 3,586,748 | 6/1971 | Ayres | 264/323 |
| 3,825,637 | 7/1974 | Robin | 264/328.7 |
| 4,265,852 | 5/1981 | Sauer | 425/387.1 |
| 4,390,487 | 6/1983 | O'Mara | 264/328.7 |
| 4,419,320 | 12/1983 | Perkins et al. | 264/296 |
| 4,717,524 | 1/1988 | Aoki | 264/550 |

FOREIGN PATENT DOCUMENTS 57-91246 6/1982 Japan ..................... 264/510
62-270317 11/1987 Japan ..................... 264/510

Primary Examiner—Jan H. Silbaugh
Assistant Examiner—Neil M. McCarthy
Attorney, Agent, or Firm—Toren, McGeady & Associates

[57] ABSTRACT

A method of manufacturing hollow articles of thermoplastic materials. Initially, a compact blank, such as a tablet, a palette, a disk or the like, is formed by injection molding into a mold cavity. The blank may be composed of a plurality of layers which surround each other. Subsequently, the blank is compression-molded in the heated state to reduce its thickness and increase its surface area size. Finally, again in the heated state, the compressed blank is formed into a hollow article by a stretching and blow-molding operation. During each injection-molding step, the volume of the mold cavity is adjusted from a minimum volume to a maximum volume at a rate which corresponds to the rate of injection of the respective plastics material. While still in the heated state, at least portions of the injection molded blank are conditioned by additional heat treatments and, subsequently and/or simultaneously, a compressed and condensed mold is formed by a compression molding operation and, finally, a hollow article is formed by a stretching and blow-molding operation.

17 Claims, 8 Drawing Sheets

METHOD FOR PRODUCING HOLLOW ARTICLES OF THERMOPLASTIC MATERIALS

BACKGROUND OF THE INVENTION

1. Field of the Invention

The present invention relates generally to a method of producing hollow articles of thermoplastic materials. More particularly, the invention relates to a method in which initially a compact blank, such as, a tablet, a pellet, a disk or the like, is formed by injection molding in a mold cavity. The blank may be composed of several layers of different plastics material components which surround one another. The blank is subsequently subjected to a compression molding operation in the heated state in which its thickness is reduced and its surface area size is increased. Finally, the hollow article is formed from the compressed blank again in the heated state in a mold by a stretching and blow molding operation.

2. Description of the Prior Art

In the production of hollow articles, particularly containers having large volumes, it is already known in the art to process prepared plastics material blanks initially in the heated state by a forging operation between die surfaces and, subsequently, to produce from the blank prepared in this manner a hollow article by means of a hot-forming or blow molding operation. This is described, for example, in Federal Republic of Germany Offenlegungsschrift No. 21 40 341.

As is the case in German Democratic Republic patent No. 58 373, the blank can also be prepared by means of an injection molding operation, as disclosed in Federal Republic of Germany Offenlegungsschrift No. 24 17 270.

The injection molded blanks to be deformed between the die surfaces initially have the shape of a relatively thick tablet, pellet or disk, which is subsequently reduced in its thickness by the compression molding operation and its structure is condensed and, simultaneously, its surface area size is increased.

The plastics material blanks prepared by injection molding can be further deformed into relatively thin layers while still in the initial heated state, i.e., immediately following the injection molding operation, by compressing the blanks with biaxial orientation. These layers can then be further deformed into the actual hollow articles by a stretching and blow molding operation.

It is also known in the art to use blanks to be deformed by a compression molding operation which have a multilayer composition made of different plastics material components. The blanks may have multiple layers with varied combinations of layers. The different layer combinations lead to different difficulties with respect to manufacture of the blanks.

The thicknesses of the layers of the individual plastics material components are determined basically by the given volumetric flows of the individual material components. However, the distribution of the material components in radial flow direction depends to a significant extent from the flow properties and the flow distances present in each case. The flow properties of the individual material components are determined by the viscosity and the melt temperature level. In addition, the wall temperatures of the injection molding tool have a substantial influence on the distribution of layer thicknesses during the non-stationary filling procedure. For example, if the viscosities of several different material components are the same under a given shearing load, a parabolic rate of flow pattern develops. On the other hand, different viscosities of the individual material components result in a combined rate of flow pattern having, for example, a discontinuous parabolic shape.

When the temperatures in the walls of the two injection molding halves are not equal, a uniform layer thickness is not formed in one and the same material component. Rather, one layer of this material component may be thinner than the other layer, so that an intermediate layer of another material component may be shifted in an undesirable manner from its predetermined center position.

The layer configurations of the plastics material blanks described above are in most cases undesirable because this substantially impairs the quality of the hollow articles to be manufactured by the stretching and blow molding operation.

These disadvantages can also not be eliminated by the compression molding and condensing operations in which the blanks are formed into compressed articles having larger surface area size prior to the stretching and blow molding operation.

It has been found that significant difficulties occur in the manufacture of compact blanks by injection molding from thermoplastic materials especially in those cases when the blanks have a relatively large volume and, simultaneously, must have a multiple layer structure, and when the blanks are to be suitable for a stretching and blow molding operation of relatively large hollow articles. In this connection, the danger exists that it is not possible to obtain the desired distribution of the plastics material conducted through the injection ducts into the mold cavity. In other words, an undesirable material layer distribution may result in the blank which would be maintained during the subsequent compression molding operation and the stretching and blow molding operation and which would negatively influence the usefulness of the finished hollow article.

The above-described disadvantage can be avoided, as indicated in Federal Republic of German Offenlegungsschrift No. 21 40 341, if the blanks to be processed between the dies are prepared by placing several layers of foil blanks of plastics material one on top of the other. However, this type of manufacture of the blanks is relatively cumbersome and expensive. In addition, plastics material blanks which are formed from foil layers and are processed between dies cannot in all cases be used for stretching and blow molding of hollow articles having relatively large volumes.

It is, therefore, the primary object of the present invention to provide a method and apparatus for the manufacture of hollow articles of thermoplastic materials in which the disadvantages mentioned above are avoided.

It is a further object of the invention to provide a method of manufacturing hollow articles of thermoplastics materials in which an exact material distribution in the mold cavity is ensured even when the blanks have to be composed of several layers of different plastics components.

It is yet another object of the present invention to optimize the layer structure of the blanks obtained by injection molding, in an operation for deforming the blanks into a compressed blank having reduced thickness and, simultaneously, an increased surface area size, for a subsequent stretching and blow molding operation during which the thickness is rendered uniform.

SUMMARY OF THE INVENTION

In accordance with the present invention, the volume of the mold cavity is changed from a minimum volume to a predetermined maximum volume during each injection molding operation, wherein the rate of the volume change is adjusted to the inlet or flow rate of the respective plastics material. Subsequently, the injection molded blank is removed from the mold cavity while still in the heated state and at least portions of the blank are conditioned from the outside by means of additional heat treatments. Simultaneously and/or subsequently, the injection molded blank is deformed and condensed into a compressed blank which is subsequently made into the hollow article by means of a stretching and blow molding operation.

It has been found that the method according to the invention described above makes possible particularly the manufacture of high quality hollow articles, especially multiple-layer, biaxially oriented containers having wide necks and a high diameter to height ratio.

It is particularly possible to produce on these hollow articles thin, but uniform, barrier layers of high-grade and expensive plastics material components. Moreover, it is ensured that the inner material layers are safely surrounded by the outer layer in the rim portions at the opening of the hollow articles and, therefore, it remains ensured that the barrier layer is embedded in the region of the opening of the container.

The flat, compressed blank can be adjusted in its thickness to the subsequent stretching and blow molding operation in such a way that the resulting hollow article has a uniform wall thickness distribution.

The rate of the volume change of the mold cavity may be continuous. In accordance with a particularly advantageous embodiment, the volume of the mold cavity may be changed by swelling flow of the plastics material.

The rate of the volume change of the mold cavity can also be intermittent or variable. In that case, the changes in the rate of flow are to be adjusted to the respectively injected quantities of the various plastics materials.

In accordance with an important feature of the invention, the change of the volume of the mold cavity is effected by means extending parallel to the direction in which the plastics material flows into the mold cavity.

In accordance with another feature of the invention, the supply of the material into the mold cavity and the volume change of the mold cavity can be effected at least essentially in vertical direction. Consequently, the flow behavior of the plastics material is influenced in such a way that an optimum material distribution is taking place in the mold cavity at any point in time of the injection molding operation and, thus, the desired intermediate structure of the blank is obtained.

In accordance with the invention, it is also provided to inject several different plastics components one after the other into the mold cavity and to inject the components one into the other, so that a layer structure is obtained in the mold cavity in which one layer surrounds the next layer.

In accordance with the invention, it is also possible to inject the various plastics material components staggered with respect to time, but in such a way that for at least some periods of time the injection into the mold cavity takes place simultaneously. Also in this case, the components are distributed in the mold cavity in a layer structure in which the layers surround each other.

In accordance with another essential feature of the invention, conditioning and heat-treatment of the injection molded blank prior to and/or during the compression molding operation is effected only at or in the vicinity of the circumferential portions or edge portions of the blank.

Moreover, in accordance with another feature of the invention, the circumferential or edge portions of the injection molded blank conditioned in the manner described above are pressed to a thickness which is smaller than the thickness of the remaining portion of the blank.

In accordance with an important feature of the invention, the injection molded blank is compressed into a flat surface area shape and/or dimension which corresponds to the cross-sectional shape and/or dimension of the hollow article to be manufactured.

In an apparatus for carrying out the above-described method of manufacturing hollow articles, the mold cavity is in part defined by a plunger whose cross-sectional area size corresponds to that of the mold cavity, wherein the plunger is axially movable for effecting the change of volume of the mold cavity and the range of travel of the plunger is limited.

In accordance with another feature of the invention, the mold cavity, the plunger and a nozzle head of the apparatus have axes which extend at least approximately in vertical direction.

In accordance with an advantageous further development of the invention, the plunger projects from the top toward the bottom into the mold cavity, while the nozzle head can be moved from below toward the top toward the mold cavity.

The plunger of the apparatus may be weight loaded, so that the volume of the mold cavity increases solely due to the swelling flow of the plastics material entering the mold cavity.

It is also possible to provide an operative connection of the plunger with the piston of a pressure medium cylinder which preferably is designed to be double-acting. Thus, the volume of the mold cavity can be influenced by pneumatic and/or hydraulic media.

In accordance with another feature of the invention, the mold cavity may be arranged on or formed in a rotary table or a sliding table, while the nozzle head is placed on a stationary frame or the like, wherein the rotary or sliding table may be arranged so as to be movable relative to the stationary frame or the like. This rotary or sliding table can then also be used to accommodate all other apparatus components which carry out the step-by-step further processing of the blank into the finished hollow article. These components are, for example, a press with the deforming dies as well as stretching and blow molding unit and ejector unit.

In accordance with another embodiment of the invention, the nozzle head has multiple ducts with a central outlet opening, so that the different plastics material components can be introduced into the mold cavity.

In accordance with yet another essential embodiment of the invention, a heat-treatment and conditioning unit can be arranged on the rotary or sliding table following the mold cavity, wherein this heat-treatment or conditioning unit may be directed or limited to certain circumferential or surface area portions of the injection molded blank.

The heat-treatment or conditioning unit may be arranged between the injection molding station and the compression molding station and may include heating elements and/or cooling elements which can be controlled or regulated.

The heat-treatment or conditioning unit may also form part of the compression molding station, or may particularly be accommodated with the dies of the compression molding station.

An advantageous and efficient sequence of operation is obtained when the mold cavity can be alternatively shifted between the range of operation of the nozzle head and the range of operation of the heat-treatment or conditioning unit. On the other hand, the heat-treatment or conditioning unit can be arranged so as to be shiftable at least partially between the range of operation of the compression molding station and the range of operation of the stretching and blow molding station.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
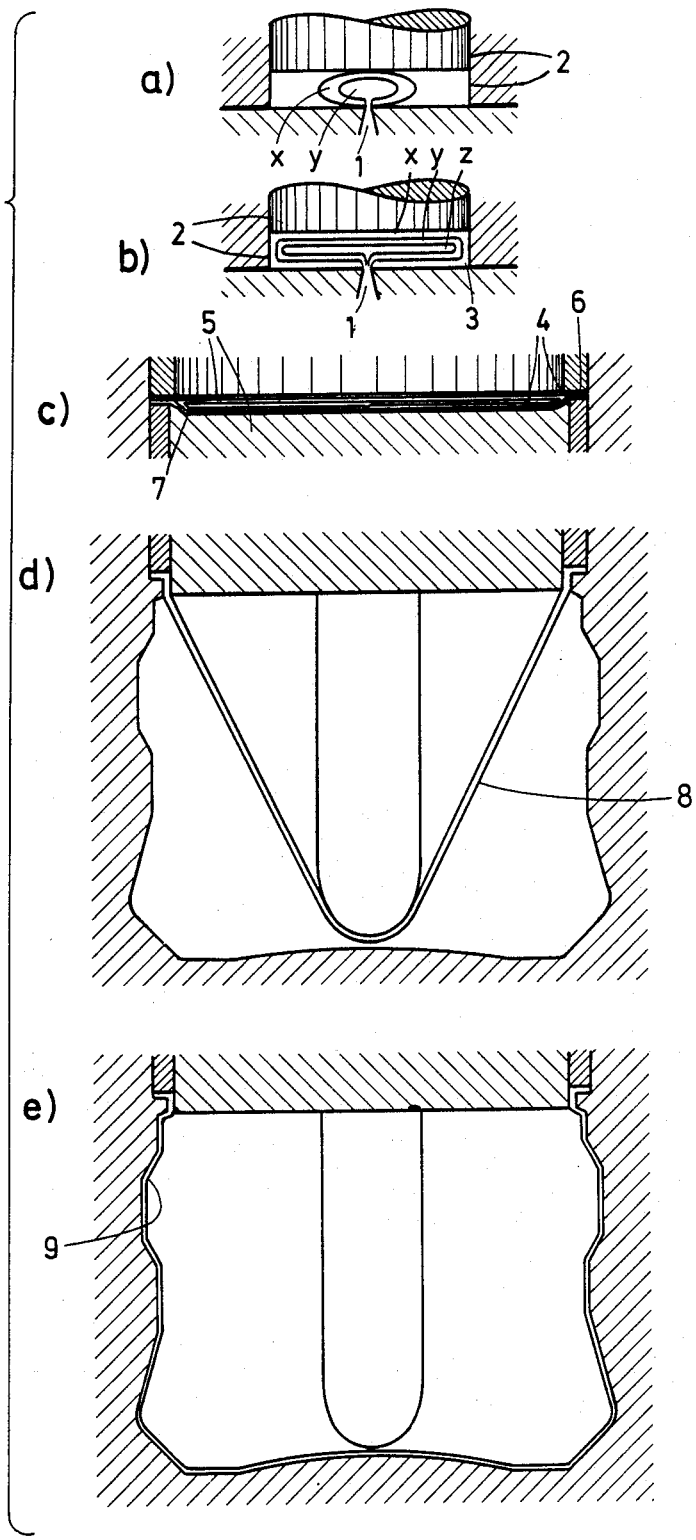
FIG. 1 is a schematic illustration showing the essential stages of the method of manufacturing hollow articles of thermoplastic materials in accordance with the invention.

FIG. 1 of the drawing shows the individual stages a–e of the method according to the present invention for manufacturing containers of thermoplastic materials. In stages a and b, a blank which may be, for example, disk-shaped, is formed by injection molding. The blank has, for example, three different plastics material or other material components. Initially, plastics material component x is introduced through nozzle head 1 in mold cavity 2. Subsequently, plastics material component y is injected by means of nozzle head 1 through the core of plastics material component x into the latter. Finally, again by means of nozzle head 1, plastics material component z is injected through the core of plastics material component y into the latter. When the injection operation into the mold cavity has concluded, initially the passage zone for the plastics material component z in plastics material component y is closed by means of a small amount of plastics material component y, and subsequently, the passage for the plastics material component y in the plastics material component x is filled by a small amount of the plastics material component x.

The illustrations of the stages a and b further show that the individual plastics material components x, y and z are distributed within the mold cavity 2 in a simple swivelling flow. In this case, the finished injection molded blank 3 has the shape of a centrally injected disk.

The plastics material blank 3 formed in stages a and b is subsequently conditioned while still in the warm state by means of additional heat treatment. The conditioning is effected over at least portions of the blank, preferably in the vicinity of its circumferential portion or its edge portion.

As a rule, the temperature of the material component x located outwardly in the plastics material blank 3 and also the temperature of material component y are increased in these circumferential edge portions, so that, in the subsequent stage c, the plastics material blank 3 can be compressed into a flat shape with the thicknesses of the layers of the individual plastics material components x, y and z being reduced, and the structure of the compressed blank 4 being condensed. Also, the edge portion 6 of the compressed blank 4 may be deformed during stage c between the die portions 5 in such a way that the edge portion has a thickness which is reduced relative to the remaining surface areas 7 of the blank.

The material structure of compressed blank 4 is subsequently stretched in stage d in a stretching operation to form an article 8 which, simultaneously or subsequently, can be deformed by supplying blowing air into the finished hollow article 9 in stage e.

Figure 2:
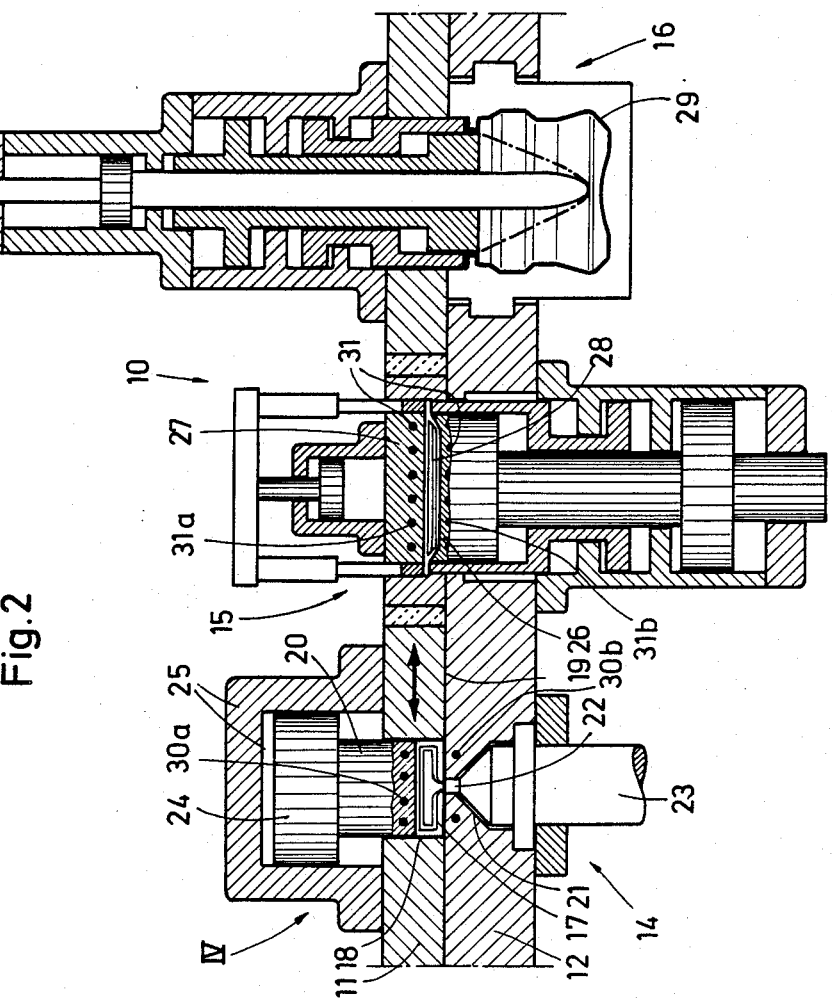
FIG. 2 is a schematically simplified vertical sectional view of an apparatus for manufacturing hollow articles of thermoplastic materials, illustrated in a first position of operation.
Figure 3:
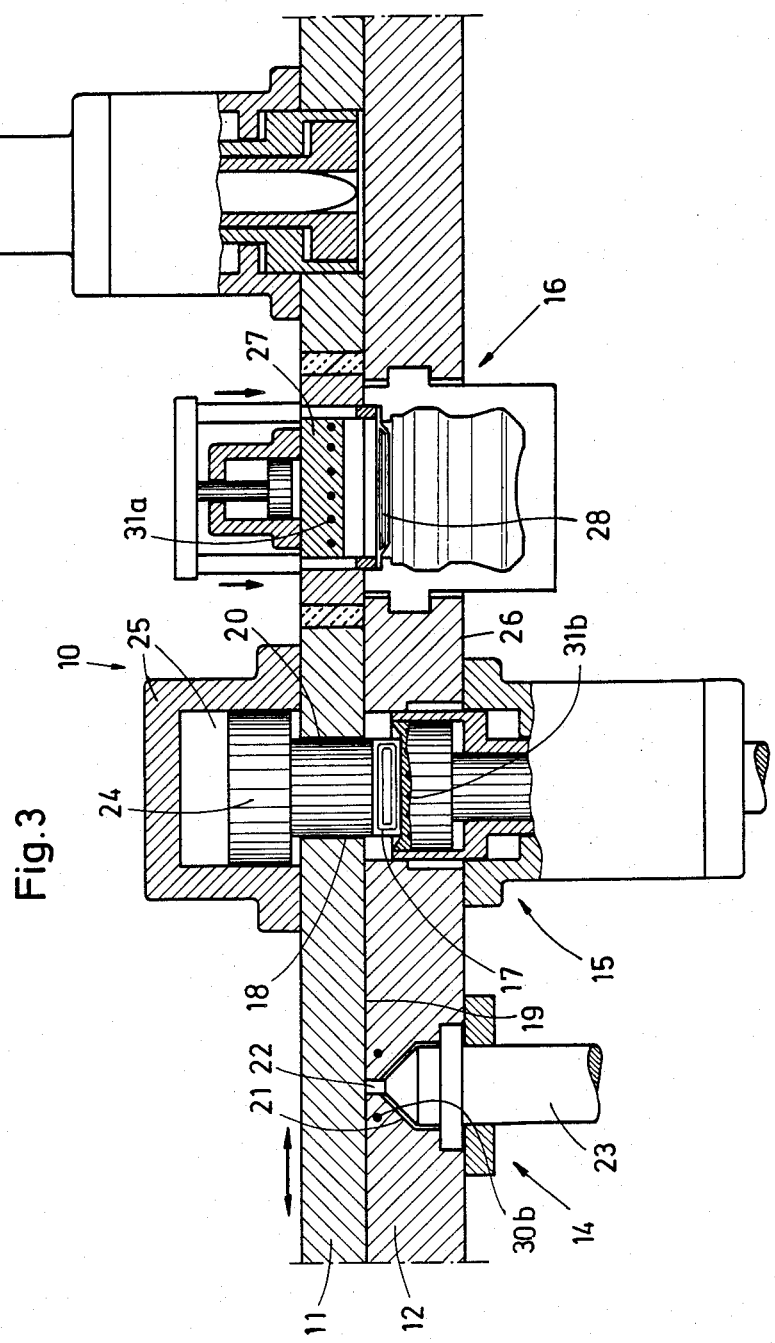
FIG. 3 shows the apparatus of FIG. 2 in a second position of operation.

The apparatus 10 for manufacturing hollow articles of thermoplastic materials illustrated in FIGS. 2 and 3 has a sliding and/or rotary table 11 which is supported by a stationary support plate 12 or a support frame, and which can be moved in a stepwise manner relative to the latter.

Apparatus 10 includes, for example, an injection molding station 14, a compression molding station 15, a stretching and blow molding station 16 and an ejector station 13, as clearly illustrated in FIGS. 2 and 3.

An important component of apparatus 10 in the present case is the injection molding station 14 in which the blanks 3 can be manufactured from thermoplastic materials, for example, in the form of tablets, pellets or disks, having round, rectangular, polygonal, elliptical or other shapes. The blanks may also have a concave shape.

In order to facilitate this injection molding stage, the rotary or sliding table 11 defines a mold cavity 18 which is open towards the bottom, i.e., toward the stationary support plate 12. Thus, it is possible to define the mold cavity 18 only by the surface 19 of the stationary support plate 12.

Extending into the mold cavity 18 from the top is a plunger 20 which fills out the cross-sectional area of the mold cavity 18. Plunger 20 is axially slidably guided in mold cavity 18, so that the volume of the mold cavity 18 can be varied in the rotary or sliding table 11 within certain limits.

An orifice 21 with a concentrically arranged passage duct 22 is provided in stationary plate 12. In the position illustrated in FIG. 2, duct 22 is in communication with mold cavity 18. A nozzle head 23 projects into orifice 21. In the schematic representation of FIG. 1, nozzle head 23 has been denoted by reference numeral 1. Plastics material melt can be introduced into the mold cavity 8 through nozzle head 23 and passage duct 22.

Nozzle head 13 is preferably constructed in such a way that it can be used to inject a plurality, preferably three, different plastics material components one after the other into the mold cavity 18. Thus, nozzle head 23 corresponds to nozzle head 1 schematically illustrated in FIG. 1.

Figure 4:
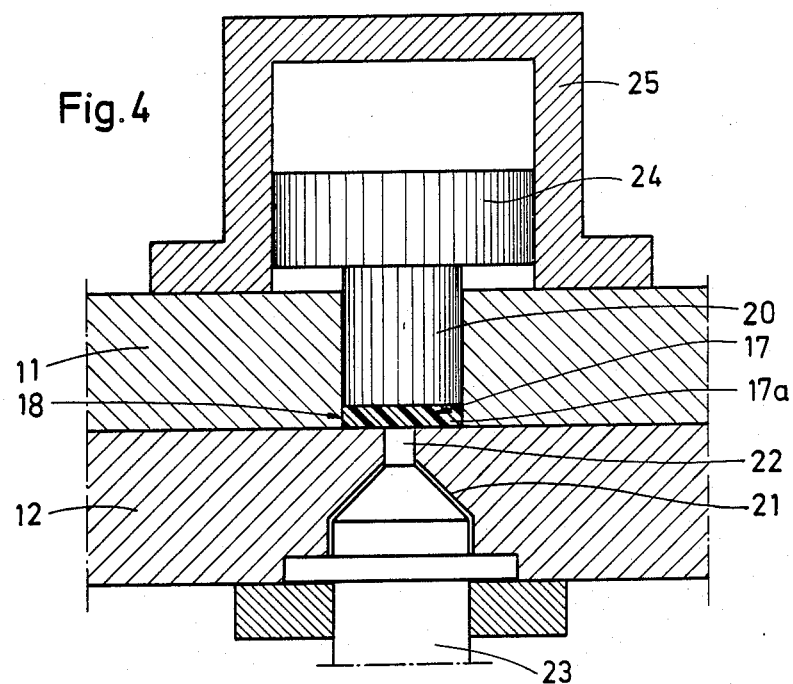
FIGS. 4 to 6 show, on a larger scale, the portion of the apparatus indicated in FIG. 2 with arrow IV, during three different stages of operation.
Figure 5:
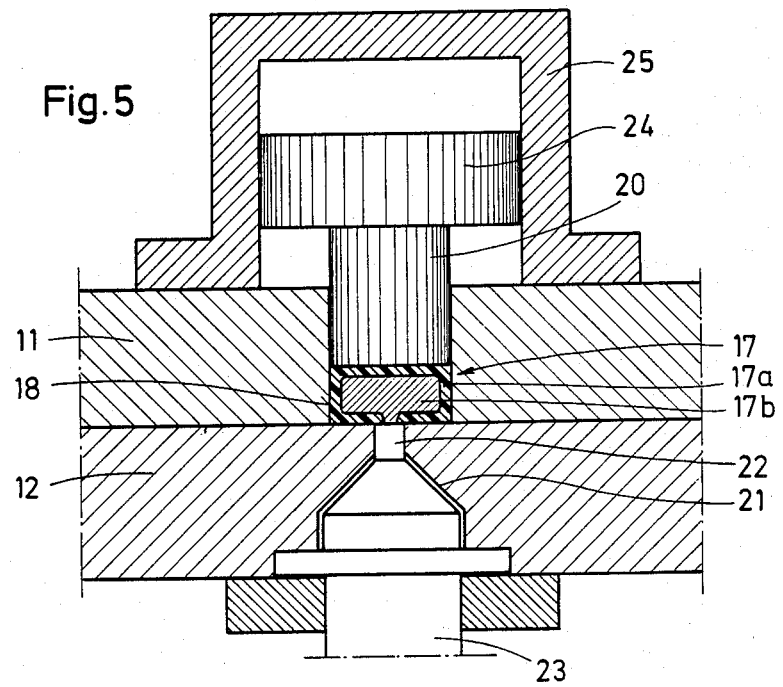
Figure 6:
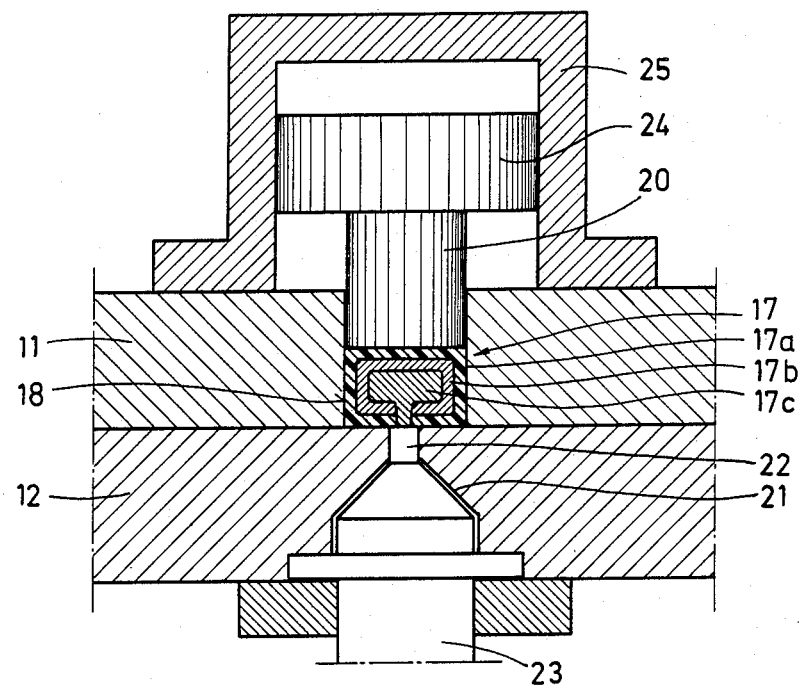

In operating the injection molding station 14, it is important that the volume of mold cavity 18 can be changed in the rotary or sliding table 11 during each injection molding procedure at a rate which is adjusted to the rate of injection of the respective plastics material, the change being effected from a minimum volume, as seen in FIG. 4, to a maximum volume as seen in FIG. 6. To make this volume change possible, plunger 20 is arranged axially movably within the mold cavity 18. Preferably, the distances by which the plunger 20 can be moved in either direction is limited.

In accordance with a particularly useful embodiment, the axes of the injection molding station 14, of mold cavity 18, of plunger 20 and of nozzle head 23 are oriented at least approximately in vertical direction.

In the embodiment illustrated in the drawing, plunger 20 projects from the top downwardly into mold cavity 18. Nozzle head 23 is connected to mold cavity 18 from below through orifice 21, as illustrated in FIGS. 2 and 3.

In some cases, it may be sufficient if the plunger 20 is under the load of a head part 24 which, in turn, is constructed in the form of a piston, so that plunger 23 moves by itself within mold cavity 18 into the its lower end position. The plunger 20 will then be moved upwardly by the plastics material melt being introduced from below into mold cavity 18. The rate of upward movement of plunger 20 depends upon the rate of injection of the plastics material melt.

Thus, the change of the volume of mold cavity 18 is effected automatically and continuously.

Figure 7:
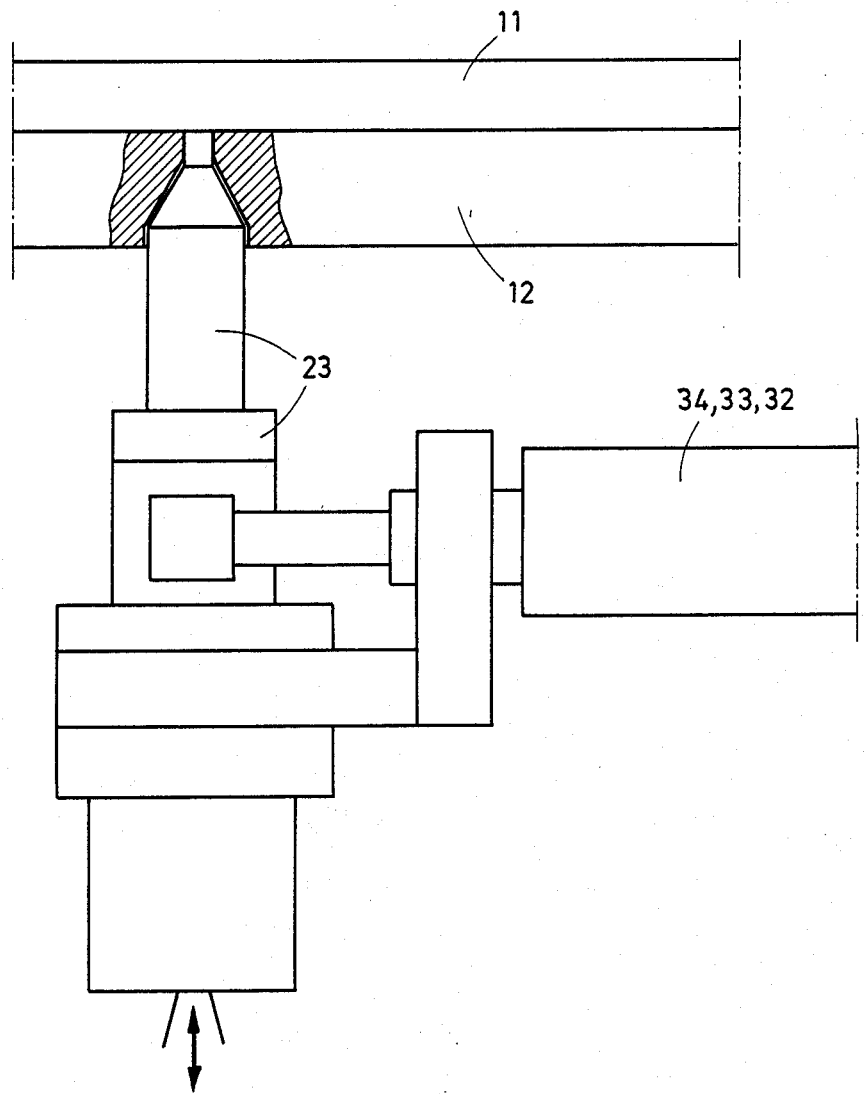
FIG. 7 shows, on a larger scale, a side view of a multiple-duct nozzle head of the apparatus including extruders.
Figure 8:
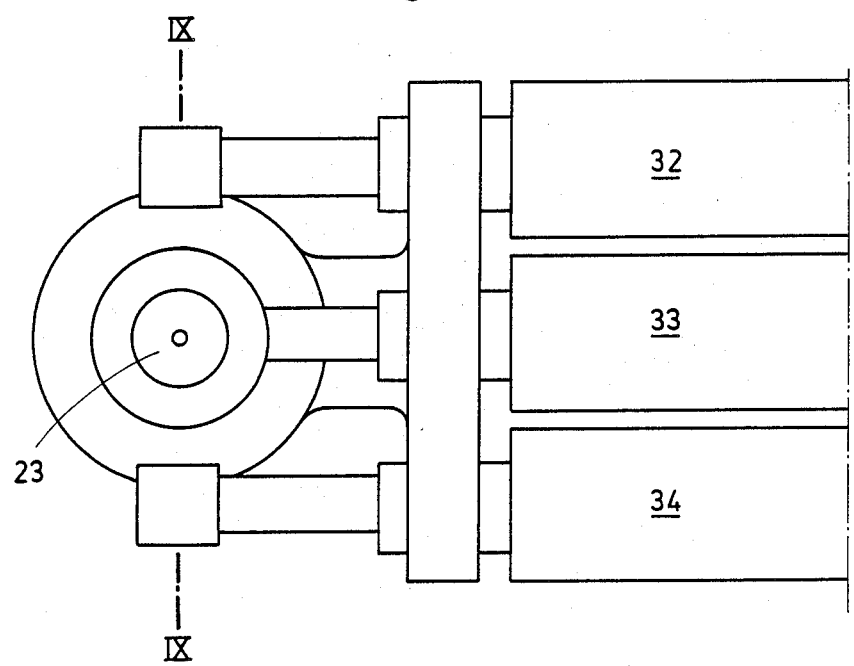
FIG. 8 is a top view of the arrangement of FIG. 7.
Figure 9:
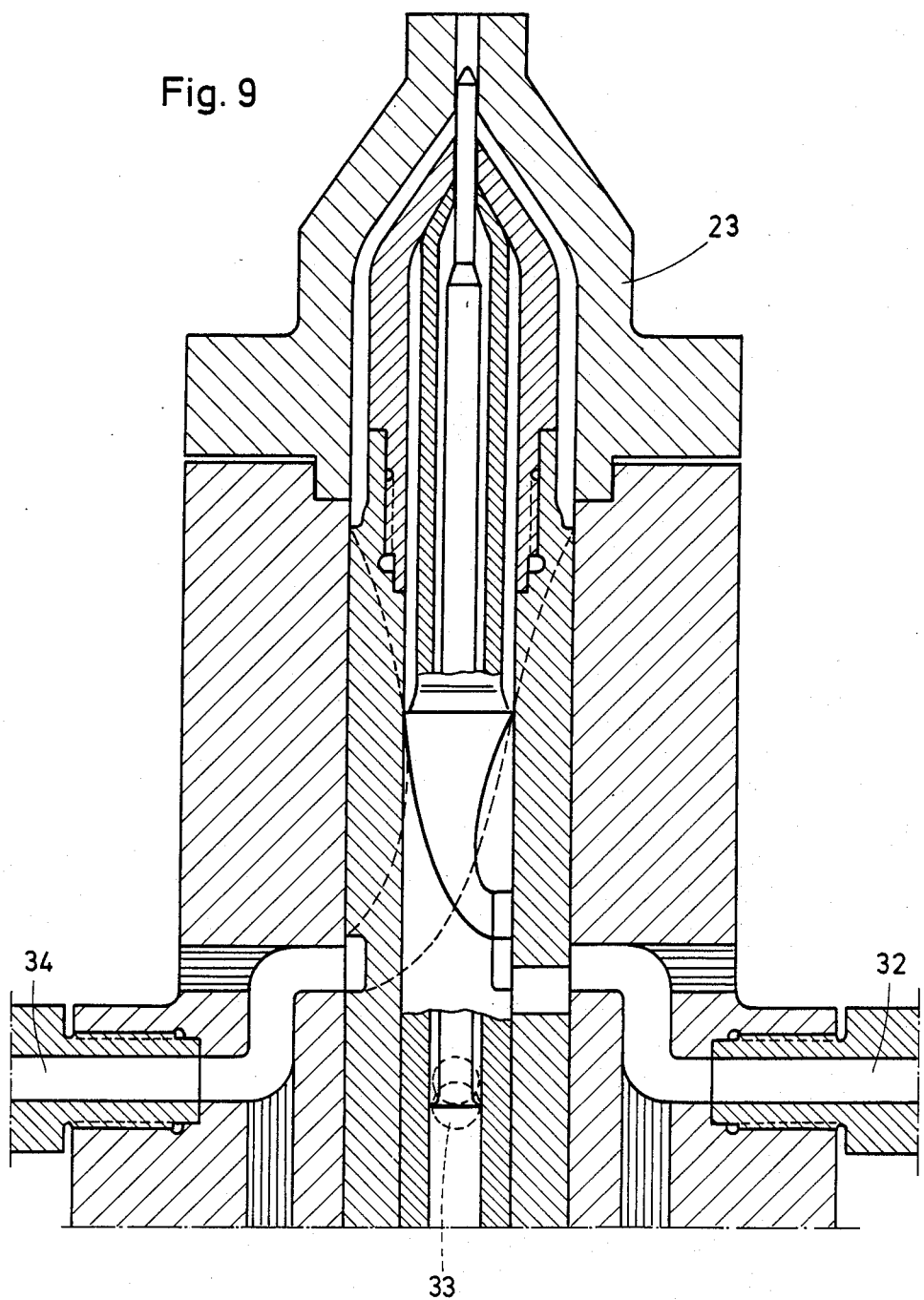
FIG. 9 shows, on an even larger scale, a sectional view taken through the multiple-duct nozzle head long line IX—IX of FIG. 8.

However, plunger 20 can also be in operative connection with the piston 24 of a pressure medium cylinder 25 which preferably is double-acting, as can be seen from the embodiment illustrated in the drawing. This pressure medium cylinder 25 preferably is double-acting, as can be seen from the embodiment illustrated in the drawing. This pressure medium cylinder 25 is mounted on the rotary or sliding table 11 which contains the mold cavity 18. Nozzle head 23, on the other hand, is mounted on a stationary frame or the like. As already mentioned, nozzle 23 may be constructed as a multiple duct nozzle head with central outlet opening, so that several different plastics material components can be introduced into the mold cavity 18 staggered with respect to time. Such a multiple duct nozzle head 23 is illustrated in FIGS. 7-9 of the drawing.

In the embodiment in which plunger 20 is in operative connection with a pressure medium cylinder 24, the change of the volume of mold cavity 18 can also be effected intermittently or discontinuously. In this case, the volume change can be effected in several steps or stages, and the respective rate of changing the volume can be exactly adjusted to the quantity of the plastics material melt to be injected.

In order to obtain an optimum distribution of the various plastics material melts within the mold cavity 18 and within each other, as illustrated in FIG. 1 at a and b, it has been found to be particularly useful to introduce the material into mold cavity 18 and to effect the volume change at least approximately in vertical direction. This makes it possible to obtain a swelling flow of the plastics material melts within the mold cavity 19 which ensures a very uniform distribution of all plastics material components x, y and z within the mold cavity 18 and within each other.

The blank 17 manufactured in mold cavity 18, which had in FIG. 1 been denoted by reference numeral 3, now is composed of several plastics material layers 17a, 17b and 17c which surround and enclose each other in a certain manner, as illustrated in FIG. 6.

The blank 17 injected into mold cavity 18 is now moved into the range of compression molding station 15 by an appropriate movement of the rotary or sliding table 11 relatively to the support plate 12, as illustrated in FIG. 3. In this position, plunger 20 presses the still heated blank 17 downwardly from mold cavity 18 into a lower die 26. Subsequently, rotary or sliding table 11 returns into its initial position shown in FIG. 2 and, simultaneously, upper die 27 of compression molding stage 15 is moved on top of lower die 26. The two dies 26 and 27 are now moved, for example, by means of a pressure medium drive, toward each other, so that blank 17 is compressed into a disk 28 whose outer circumference is substantially increased, while its thickness is reduced accordingly. Within this disk 28, the various plastics material layers 17a to 17c are also substantially reduced in their thickness while their distribution within the disk remains the same.

The plastics material disk 28 obtained by compressing the plastics material blank 17 is now moved by means of the rotary or sliding table 11 into the region of the stretching and blow molding station 16, as illustrated in FIG. 3, and is deformed in a stretching and blow molding operation into a hollow plastics material article 29, for example, a container having a wide neck, as it can be seen in FIG. 1 at e and in FIG. 2.

Of course, it is also possible to manufacture plastics material blank 17 in the injection molding station 14 which are composed of only a single plastics material. On the other hand, it is of course also possible to manufacture plastics material blanks 17 in the injection molding station 14 which are composed of more than three plastics material components which surround each other in the form of layers.

Although it has been found in practice to be particularly advantageous to inject the plastics material components x, y and z centrally into the mold cavity 18, it is, of course, also possible to inject the various plastics material components x, y and z at different locations into the mold cavity 18. However, an optimum and problem-free material distribution is obtained by the central plastics material supply into the mold cavity 18 as it is the case in the illustrated embodiments.

Another important aspect of the manufacture of hollow articles from thermoplastic materials is that the injection molded blank 17 can be conditioned at least partially from the outside by additional heat treatments either prior to and/or during its deformation into the disk 28 which is relatively thin but has a large surface area, as it is denoted by reference numeral 4 in FIG. 1 at c. To make this conditioning step possible, a separate heat treatment or conditioning unit is arranged on the rotary or sliding table 11 with and/or following the injection molding station 14 or the mold cavity 18. This heat treatment and conditioning unit 30 can be provided immediately adjacent mold cavity 18. The unit may be formed by, for example, heating elements and/or cooling elements or heating ducts and/or cooling ducts 30a in the plunger 20. On the other hand, it is also possible to provide the heating or cooling elements or ducts 30b in support plate 12.

FIGS. 2 and 3 further show that a heat treatment and conditioning unit 31 can also be arranged immediately adjacent the compression molding station 15. In this case, heating or cooling elements for ducts 31a are provided in the upper die 27 and similar heating or cooling elements or ducts 31b are provided in lower die 28.

The heat treatment and conditioning units 30 and 31 are arranged and constructed in such a way that they act only on certain circumferential or surface portions of blank 17 or disk 28, and that their temperature can be controlled or regulated.

Further, the heat treatment and conditioning units 30 and 31 are to be constructed in such a way that, prior to and/or during the compression molding operation, they act on the blank 17 or disk 28 only at or in the vicinity of the circumferential or edge portions.

As can be seen from FIGS. 2 and 3, the subsequently conditioned circumferential portions or edge portions of the blank 17 can be reduced to a thickness in the compression molding operation of the disk 28 which is substantially smaller than the thickness of the remaining portions of this disk 28. In this connection, reference is made to stage c illustrated in FIG. 1 where it can be seen that the circumferential or edge portions 6 are compressed to a substantially smaller thickness as compared to the remaining portions 7 of the disk 4. The peripheral shape of the flat disk 28 or 4 between the two dies 26 and 27 of compression molding station 15 is adjusted in such a way that it corresponds as much as possible to the cross-sectional shape and/or dimension of the later hollow article 9, as shown in FIG. 1, or hollow article 29, as shown in FIG. 2.

FIG. 2 illustrates the manufacture of hollow article 29 from flat disk 28 in the region of the stretching and blow molding station 16. FIG. 2 further shows how blow-molded hollow article 29 can be removed from the blow mold by means of ejector station 13.

FIG. 3 further illustrates how disk 28 compressed in compression molding station 15 reaches the region of stretching and blow molding station 16, while the previously injected blank is moved from mold cavity 18 into compression molding station 15.

FIGS. 7 to 9 show nozzle head 23 in more detail. FIGS. 7 to 9 particularly show that nozzle head 23 is in operative connection with three different extruders 32, 33 and 34 in which different plastics material components are prepared and supplied to nozzle head 23.

FIG. 9 particularly shows that nozzle head 23 is a multiple-duct nozzle head which is provided with a central outlet duct 23a which corresponds to duct 22 of orifice 21 in support plate 12. This arrangement makes possible an exact quantitative metering of the different plastics material components supplied to mold cavity 18.

While specific embodiments of the invention have been shown and described in detail to illustrate the application of the inventive principles, it will be understood that the invention may be embodied otherwise without departing from such principles.

I claim:

1. A method of producing hollow articles of thermoplastic materials, comprising the steps of
   preparing a compact blank composed of at least two plastics material layers which surround one another by successively injecting the plastics material components for each layer into a mold cavity until the mold cavity is filled, the mold cavity having a variable volume, the volume of the mold cavity being adjusted as each plastics material component is injected, the adjustment of the volume being carried out at a rate in accordance with the rate of flow of each plastics material component as each plastics material component enters the mold cavity, so that the volume of the mold cavity is adjusted from a minimum volume corresponding to the quantity of the first plastics material component injected in the mold cavity to a maximum volume corresponding to the quantities of all plastics material components injected in the mold cavity,
   conditioning at least portions of the blank from outside the blank while the blank is in a heated state by an additional heat treatment,
   removing the heated blank from the mold cavity,
   reducing the thickness and increasing the surface area size of the heated blank by a compression molding operation, and
   stretching and blow-molding the compressed heated blank into a hollow article.

2. The method according to claim 1, wherein the compact blank is a tablet, palette or disk.

3. The method according to claim 1, wherein the blank is removed from the mold cavity prior to the conditioning step.

4. The method according to claim 1, wherein the blank is removed from the mold cavity after the conditioning step.

5. The method according to claim 1, wherein the compression molding step is performed simultaneously with the conditioning step.

6. The method according to claim 1, wherein the compression molding step is performed after the conditioning 7. The method according to claim 1, wherein the rate of volume change of the mold cavity is continuous.

8. The method according to claim 7, wherein the volume of the mold cavity is adjusted by swelling flow of the plastics material into the mold cavity.

9. The method according to claim 1, wherein the rate of volume change of the mold cavity is intermittent.

10. The method according to claim 1, wherein the rate of volume change of the mold cavity is variable.

11. The method according to claim 1, wherein the change of volume of the mold cavity is effected in a direction parallel to the flow direction of the plastics material into the mold cavity.

12. The method according to claim 1, wherein the plastics material is supplied into the mold cavity and the volume change of the mold cavity are effected at least approximately in vertical direction.

13. The method according to claim 1, wherein at least two plastics material components are successively injected into the mold cavity so that each plastics material component is surrounded by the subsequently injected plastics material component.

14. The method according to claim 1, wherein the at least two plastics material components are injected into the mold cavity staggered with respect to time, but at least partially simultaneously.

15. The method according to claim 1, wherein the blank is conditioned at or in the vicinity of the edge portion.

16. The method according to claim 15, wherein the conditioned edge portions are compressed to a thickness which is smaller than the thickness of the remaining portions of the blank.

17. The method according to claim 1, wherein the blank is compressed into a flat shape which corresponds to the cross-sectional shape of the hollow article to be blow-molded.

* * * * *